United States Patent
Nakayasu et al.

(10) Patent No.: US 7,052,037 B2
(45) Date of Patent: May 30, 2006

(54) INFLATOR FOR AIR BAG

(75) Inventors: Masayuki Nakayasu, Himeji (JP); Nobuyuki Katsuda, Himeji (JP)

(73) Assignee: Daicel Chemical Industrials, Ltd., Osaka (JP)

(*) Notice: Subject to any disclaimer, the term of this patent is extended or adjusted under 35 U.S.C. 154(b) by 187 days.

(21) Appl. No.: 10/694,173

(22) Filed: Oct. 28, 2003

(65) Prior Publication Data

US 2004/0130134 A1 Jul. 8, 2004

Related U.S. Application Data

(60) Provisional application No. 60/422,853, filed on Nov. 1, 2002.

(30) Foreign Application Priority Data

| Oct. 29, 2002 | (JP) | ............................. 2002-313831 |
| Oct. 16, 2003 | (JP) | ............................. 2003-356645 |

(51) Int. Cl.
*B60R 21/22* (2006.01)
(52) U.S. Cl. .................... 280/730.2; 280/736; 280/737; 280/740
(58) Field of Classification Search ............. 280/730.2, 280/736, 737, 740, 741, 742
See application file for complete search history.

(56) References Cited

U.S. PATENT DOCUMENTS

| 6,022,045 | A | * | 2/2000 | Faigle ......................... 280/736 |
| 6,293,581 | B1 | * | 9/2001 | Saita et al. ............... 280/730.2 |
| 6,543,804 | B1 | * | 4/2003 | Fischer ..................... 280/730.2 |
| 6,601,871 | B1 | * | 8/2003 | Fischer ..................... 280/730.2 |
| 6,612,326 | B1 | * | 9/2003 | Specht et al. ............. 137/68.13 |
| 6,802,532 | B1 | * | 10/2004 | Heigl et al. ................. 280/736 |
| 2002/0105174 | A1 | * | 8/2002 | Tanase et al. ............ 280/730.2 |
| 2002/0125694 | A1 | * | 9/2002 | Webber et al. ........... 280/730.2 |
| 2002/0125697 | A1 | * | 9/2002 | Heigl ....................... 280/730.2 |
| 2002/0190511 | A1 | * | 12/2002 | Watase et al. ............. 280/740 |
| 2003/0001370 | A1 | * | 1/2003 | Ryobo et al. .............. 280/741 |
| 2005/0012309 | A1 | * | 1/2005 | Blackson et al. ........ 280/730.2 |
| 2005/0173906 | A1 | * | 8/2005 | Nakayasu et al. .......... 280/737 |

FOREIGN PATENT DOCUMENTS

| JP | 9-254736 A | 9/1997 |
| JP | 2001-277987 A | 10/2001 |

* cited by examiner

*Primary Examiner*—Paul N. Dickson
*Assistant Examiner*—Toan C. To
(74) *Attorney, Agent, or Firm*—Birch, Stewart, Kolasch & Birch, LLP

(57) ABSTRACT

An inflator for an air bag comprises, a diffuser portion having a gas discharging port and a gas discharging duct extending from the gas discharging port in an axial direction of an inflator housing, wherein the total opening area of a plurality of openings provided at distal ends of a branched portion in the gas discharging duct is larger than the opening area of an orifice portion provided inside the diffuser portion.

7 Claims, 3 Drawing Sheets

INFLATOR FOR AIR BAG

CROSS REFERENCE TO RELATED APPLICATIONS

This Nonprovisional application claims priority under 35 U.S.C. § 119(e) on U.S. Provisional Application No(s). 60/422,853 filed on Nov. 1, 2002 and under 35 U.S.C. § 119(a) on patent application No(s). 2002-313831 and 2003-356645 filed in Japan on Oct. 29, 2002 and Oct. 16, 2003, the entire contents of which are hereby incorporated by reference.

BACKGROUND OF THE INVENTION

1. Field of the Invention

The present invention relates to an inflator for an air bag which is used in an air bag system mounted on a vehicle to discharge a gas for inflating an air bag at the time of collision, and in particular to an inflator for an air bag preferably used in a curtain air bag system which inflates an air bag to cover an approximately entire surface of a side window mainly at the time of side collision in a vehicle.

2. Description of Related Art

In order to protect a passenger from an impact at the time of a vehicle collision, various air bag systems (inflating-type safety apparatuses) are mounted in a vehicle. These air bag systems are formed such that they can achieve an optimal passenger protection according to a seat position of the passenger inside the vehicle, a protecting (restraining) method for the passenger subjected to the impact or the like. Various air bag systems such as one arranged at a driver side, one arranged at a front passenger side, one for protecting a passenger from a side collision, and one for inflating a curtain air bag are provided currently.

These air bag systems of various kinds include an inflator for generating gas for inflating an air bag (a bag body) at the time of activation, and such an inflator is provided, such that a pressurized medium such as a pressurized gas is charged as a gas source for inflating the air bag.

In particular, an air bag system for inflating a curtain air bag (hereinafter, referred to as a "curtain air bag system") is for inflating and developing a curtain-like air bag over a window of a vehicle instantaneously when the vehicle receives an impact from a lateral direction, and it is for protecting the head or neck of a passenger from the impact at the time of collision or it aims to prevent the passenger from being thrown out of the vehicle at overturn of vehicle. In particular, the curtain air bag system which aims to protect the passenger at the time of overturn of vehicle is required to protect the passenger while the vehicle is turning laterally, and it is necessary to maintain a developing state of the bag for at least five seconds. For this reason, in an inflator used in the curtain air bag system, a medium whose volume change due to cooling is small, for example, a pressurized gas such as helium is used as a gas source for inflating the air bag. This kind of pressurized gas is charged in a housing which is generally a pressure-resistance container and it is prevented from flowing out of the housing by being sealed with a rupturable plate or the like. And such a mechanism is employed that the rupturable plate is ruptured by an igniter or the like to feed the pressurized gas into a curtain air bag (a bag body) at the time of activation.

In such an inflator, since discharging of the pressurized gas is conducted by rupturing of the rupturable plate, fragments of the ruptured rupturable plate may be mixed in a gas flowing into the air bag unless any countermeasure is taken. Since such fragments are not preferable in view of safety at activation of the air bag system, these fragments should be blocked from flowing into the air bag.

In order to block inflow of the fragments into the air bag, a filter or the like can be disposed in the inflator to arrest the fragments. However, the filter or the like needs to be disposed in a gas flow passage, and operation performance, in particular, the amount of the discharged gas may be changed at activation due to change of a ventilation resistance caused by the clogging with arrested fragments. Accordingly, unless an output change of an inflator due to clogging in the filter is considered in advance, a sufficient operation performance can not obtained, or even if the output change is considered in advance, the operation performance is eventually controlled by an uncertain factor such as a ruptured state of the rupturable plate.

Therefore, it is conventionally desired to provide an inflator for an air bag which prevents fragments of the rupturable plate from flowing into an air bag and shows a stable operation performance.

Further, the air bag system is desired to have a smaller volume in order to obtain occupants' space inside a vehicle or the like, and particularly in the curtain air bag system, its installation place is limited to a place near a window on a side surface of the vehicle because of its purpose of installation, and thereby, an inflator used in the system desirably has a smallest volume and is elongated axially.

Especially, when curtain air bags are inflated, it is necessary to equally develop a curtain air bag for a front seat and a curtain air bag for a rear seat, and it is desired to arrange an inflator for a curtain air bag at a substantially middle portion between the front seat and the rear seat, having the same distance to both curtain air bags in order to equally develop the curtain air bags in the both seats. However, a mounting space for the inflator in the vicinity of a side window is limited, and therefore, the inflator is obligated to be arranged only in either side of the front seat and the rear seat. As a result, there is such an actual situation that it becomes difficult to develop the front and rear curtain air bags at the same time. For example, if an inflator is mounted in the vicinity of an A pillar (the forefront pillar of the vehicle) of the vehicle to develop the front and rear curtain air bags, the curtain air bag in the rear seat side is always delayed starting and completing development because an inflating gas has to move a longer distance (a distance to the air bag) to reach the air bag in the rear seat side. On the contrary, when the inflator is mounted in the vicinity of a C pillar (the rearmost pillar of the vehicle), the curtain air bag in the front seat side is delayed completing development.

Further, in inflators used in various kinds of air bag systems, it is also important that manufacturing cost can be reduced, a sufficient durability can be ensured and further a rapid operation can be made as required, and such an object completely applies to the inflator used in the curtain air bag (hereinafter, referred to as an "inflator for a curtain air bag). Here, it is expected that an inflator is made of iron in order to reduce manufacturing cost, but a vehicle mounted with the inflator is used in various environments including an extreme cold place and a tropical area, and in such a case that the inflator is used in an area having a large difference in temperature throughout a day, water drops adhere to an inflator surface for a long time, which causes rust. And if rust occur on the inflator surface, there is a risk that the rust influences another part such as an electric circuit or the like positioned in the vicinity of the rust.

Therefore, it is conventionally desired to provide an inflator which can develop a curtain air bag for a front seat and a curtain air bag for a rear seat evenly in addition of a shape limitation of an inflator because of an arrangement place, or an inflator which can solve the problem regarding corrosion effectively.

As the conventional art regarding the curtain air bag system, for example, there is JP-A 9-254736.

DISCLOSURE OF THE INVENTION

However, the art disclosed in JP-A 9-254736 relates to a development structure of an air bag, and the publication does not include the detailed description of the inflator. And, there is neither any description nor suggestion about capturing fragments of the rupturable plate which may flow into the air bag.

SUMMARY OF THE INVENTION

Therefore, the present invention provides an inflator for an air bag which shows a stable operation performance without inflow of fragments of a rupturable plate into an air bag, is hardly influenced by environmental changes regarding its durability while reducing manufacturing cost in addition to a shape limitation of the inflator because of an arrangement place, and is easily connected with a curtain air bag without taking much mounting space.

In order to solve the above-described problem, the present invention provides the following inflator for an air bag. That is, an inflator for an air bag, comprising:

a cylindrical inflator housing charged with a pressurized medium inside and formed with an opening portion at an axial end portion thereof;

a diffuser portion installed at the opening portion of the inflator housing, provided with a gas discharging port, and having an inner space extending from the opening portion to the gas discharging port as a gas flow passage;

a rupturable plate provided in the gas flow passage inside the diffuser portion to seal outflow of the pressurized medium;

ignition means accommodated inside the diffuser portion and adapted to rupture the rupturable plate upon activation; and a gas discharging duct extending from the gas discharging port and having a distal end branched in opposite two directions, wherein an orifice portion for regulating a gas flow amount is formed in the gas flow passage inside the diffuser portion while distal ends of the branched portions in the gas discharging duct are formed with a plurality of openings, and the plurality of openings is provided at the distal end of the branched portion in the gas discharging duct are formed such that the total opening area thereof is larger than the opening area of the orifice portion.

In such an inflator according to the present invention, while the orifice portion is formed in the gas flow passage inside the diffuser portion having the gas discharging port, the gas discharging duct which extends from the gas discharging port and whose distal end is branched in the two direction is provided, the plurality of openings are provided at distal ends of the branched portions of the gas discharging duct, the total opening area of the plurality of openings is set larger than the opening area of the orifice portion, and thereby, the rupturable plate is collected effectively and a stable operation performance can be exhibited.

That is, the orifice portion for controlling the gas flow amount is formed such that its area is smaller than any other area (flow passage sectional area) of flow passages, and therefore, if a member having a filter function (namely, a function for collecting fragments or the like) exists in the orifice portion, the fragments of the rupturable plate or the like are collected by the member having a filter function when they pass through the orifice, so that the flow passage sectional area of the orifice portion is further narrowed and the flow amount of the gas is lowered, which influences a developing performance of the air bag. In view of these circumstances, in the present invention, the gas discharging duct provided with the filter function for collecting fragments of the rupturable plate is arranged at a downstream position than the orifice portion (namely, in the air bag side), and the total opening area of the opening portions formed in the gas discharging duct (the sum of the opening areas of all the opening portions existing on both sides of the gas discharging duct) is made larger than the opening area of the orifice portion, so that, even if fragments of the rupturable plate gather in the opening portion of the gas discharging duct, it does not affect the gas flow amount adjusting function of the orifice portion, and it does not influence a developing performance of the air bag. Accordingly, in this inflator, collection of the fragments of the rupturable plate does not influence an output performance of the inflator. Further, the gas discharging duct has a function for reducing or canceling a propelling force by dividing a gas flow towards the air bag into opposite two directions and forms a complicated flow of a gas with a relatively short distance, so that collection (or gathering) of fragments or the like is made easier and a gas discharging can be conducted swiftly. Thereby, the present invention is suitable for an inflator used in an air bag system required to develop an air bag in a short time, especially such as an air bag system for a side collision, a curtain air bag system or the like.

In this invention, the inflator housing is a pressure-resistance container which can store a predetermined amount of pressurized medium at least in the inner space, and it can be formed in various column shapes such as a cylindrical shape. The housing is preferably made of iron in order to reduce manufacturing cost. In the inflator of the present invention, by using the gas discharging duct, as described later, it is possible to arrange the inflator such that the axis of the inflator housing is substantially vertical. With such an arrangement, even if water drops generated due to a temperature difference adhere to an inflator housing surface, water drops adhered to the housing surface are liable to gradually drop from an upper portion of the housing and a possibility such that the water drops remain on the housing surface becomes small, because the housing is long in the axial direction thereof and the axis thereof is arranged vertically. Accordingly, even if the inflator housing is formed of iron, it becomes possible to suppress occurrence of rust on the housing surface. Further, the housing is formed to have at least one opening portion. The opening portion is always closed by the rupturable plate described later, and it functions to discharge the pressurized medium inside the housing due to that the rupturable plate is ruptured at the time of activation.

In the present invention, the inflator can be arranged such that its axis is oriented in the direction other than the vertical direction, for example, a horizontal direction. Because of limitation of an inflator mounting space, when the inflator is disposed such that the central axis thereof is oriented horizontally, the inflator for a curtain air bag can be arranged in the vicinity of a vehicle ceiling portion above a side window.

In this case, when the gas discharging port is provided in the axial direction of the inflator housing, it becomes necessary to change a direction of a gas flow until it reaches the distal end portion of the discharging duct. At this time, also, in view of the circumstances of the inflator mounting space, there is such a case that the arrangement position of the inflator itself or the duct must be set nearer to the front seat or the rear seat, so that a difference in moving distance of a gas between the gas discharging dust distal end portion and the curtain air bags necessarily occurs between the front seat side and the rear seat side. As a result, the one having a longer moving distance of a gas takes more time to start and finish development of the air bag, which results in a difference in a passenger restraining performance.

However, by setting the total opening area of the plural openings provided in the distal end portions of the gas discharging duct such that the total opening area of openings for discharging a gas into a bag for a front seat and the total opening area of opening for discharging a gas into a bag for the rear seat are different from each other, such a difference can be canceled. For example, if a mounting position of the inflator, or the gas discharging duct is positioned nearer to the front seat, the moving distance of a gas to the curtain air bag for a rear seat becomes longer, and therefore it is necessary to develop the curtain air bag for a rear seat preferentially. In view of this, by setting the total opening area of the openings for discharging a gas into the bag for a rear seat to be larger than the total opening area of the openings for discharging a gas into the bag for the front seat, it becomes possible to develop the curtain air bag of the front seat and the curtain air bag of the rear seat evenly in substantially equal times.

As the pressurized medium charged into the housing, a known pressurized medium used in an inflator exclusively using a pressurized medium as the gas source for inflating an air bag, a hybrid type inflator or the like, a pressurized gas, such as argon, helium, nitrogen gas can be used.

Further, the rupturable plate for sealing the pressurized medium is formed by using metal or the like as a member which can be ruptured by activation of the ignition means. Therefore, the rupturable plate is ruptured by the ignition means, a sealed state of the pressurized medium inside the inflator housing is canceled and a gas is discharged. Besides that such a rupturable plate is installed to close the opening portion for discharging a gas which is formed in the inflator housing, it can be installed to close the gas flow passage obtained inside the diffuser portion provided at the opening portion, namely, the flow passage of a gas extending from the opening portion to the gas discharging port of the diffuser portion. In other words, the rupturable plate has a function of sealing the pressurized medium inside the inflator before activation, and it can be provided at any position at which this function can be accomplished.

The above-described ignition means includes an igniter which receives an electric signal to be activated, and it can be constituted to further include a transfer charge ignited and burnt by the activation of the igniter. Naturally, the ignition means can comprise only the igniter. As this igniter, a conventionally known electric igniter can be used, and this electric igniter receives an ignition signal from an ignition signal outputting means to be activated. With respect to electrical connections between the ignition signal outputting means and the respective electric igniters, a bus system can be used. And the igniter can be provided inside the diffuser portion connected to the inflator housing.

In particular, it is desirable that the igniter included in the ignition means is provided to cross the axis of the inflator housing. The igniter includes a priming ignited and burnt at the time of activation, and a direction of a portion of the igniter which accommodates the priming is coincident with a direction of the igniter. By arranging the igniter in the direction in which the priming accommodating portion crosses the axis of the inflator housing, the igniter is prevented from interfering with the gas flow passage obtained inside the gas discharging duct, and a size reduction of the inflator can be achieved by making the diametrical width of the housing small. That is, if the igniter is provided in the direction along the axial direction of the inflator housing, a flow of the pressurized medium has to once be turned in the radial direction, and therefore, a pipe for guiding a gas into the bag projects in the radial direction and the inflator becomes bulky. However, if the igniter is provided in the direction to cross the axial direction of the inflator housing, preferably the direction orthogonal to this axis, it becomes unnecessary to mount such a member for once turning a flow of the pressurized medium in the radial direction, and the inflator can be made compact. Since the inflator formed small in the diametrical direction can be installed inside a pillar of a vehicle, a ceiling thereof or in the vicinity thereof, the inflator can be arranged efficiently while reduction of the vehicle interior space is avoided.

Further, the diffuser portion is installed at the opening portion of the inflator housing and is formed to have at least the gas discharging port. A space from the opening portion of the inflator housing to the gas discharging port in the inner space of the diffuser portion is set as the gas flow passage. The rupturable plate for sealing the pressurized medium can be provided at the gas flow passage formed in the inner space of the diffuser portion or the opening portion of the inflator housing, and an orifice for restricting a flow amount of the pressurized medium can be provided as well. The above-described ignition means can be provided in the vicinity of the rupturable plate inside the diffuser portion.

And the gas discharging duct can be provided at the gas discharging port formed in the diffuser portion. This gas discharging duct comprises a branched portion which exists at a distal end and is branched in the opposite two directions, and a guiding portion extending from the gas discharging port to the branched portion, and a plurality of openings for discharging a gas flowing in the gas discharging duct are formed at distal ends of the branched portion. The branched portion does not have to be formed straight and it may be curved slightly in a crossing portion with the guiding portion. Further, the guiding portion can also take such an aspect as it extends towards the axial direction of the inflator housing or an aspect as it once extends towards an direction other than the axial direction of the inflator housing (for example, the radial direction or the like), and it varies according to a mounting position of the inflator for a curtain air bag to a vehicle or the like.

When the inflator housing is in a cylindrical shape elongated axially rather than radially, it is desirable that at least part of the gas discharging duct includes a portion extending in the axial direction of the inflator housing and the branched portion is formed in a substantially "T"-letter shape. Further, the gas discharging duct can take a constitution that, after extending in the axial direction of the inflator housing, it is bent at one or at least two portions and the branched portion formed in the substantially "T"-letter shape is provided ahead thereof. That is, when the entire guiding portion in the gas discharging duct extends in the axial direction of the housing, the "T"-letter shaped branched portion can be formed ahead of the guiding portion to make the whole gas discharging duct in the "T"-letter shape. In addition, when the guiding portion extending in the axial direction of the housing turns in the radial direction of the housing on the way, the substantially "T"-letter shaped branched portion is provided ahead of the turned portion so that a portion ahead of the turned portion can be formed in a substantially "T"-letter shape. Alternatively, such a constitution can be employed that the guiding portion extends in the radial direction of the diffuser housing and its distal end is in a substantially "T"-letter shape. By forming the inflator housing in a cylindrical shape elongated axially, at the time of being installed in a vehicle to be used in a curtain air bag system, an inflator using this housing can be mounted to a pillar portion of the vehicle to make the axial direction of the housing vertical. As a result, even if water drops adhere to an inflator surface due to an environmental change, the water drops fall off swiftly without staying on the periphery of the inflator, so that the inflator itself is prevented from being corroded due to rust, or peripheral electronic parts or the like is prevented from being influenced by the corrosion. Alternatively, the inflator can be mounted to a ceiling in the vicinity of a side window or in the vicinity thereof, and a small mounting space in a vehicle can be utilized effectively.

Then, by forming the entire of the gas discharging duct or part thereof into a "T"-letter shape, an end portion thereof can be mounted directly to a curtain air bag disposed in a ceiling portion. Further, by providing such a "T"-letter shaped gas discharging duct, a distance from the inflator to the air bag can be shortened. As a result, the air bag can be developed swiftly after activation of the inflator, and also, the structure can be simplified. Further, since the gas discharging duct is formed to have the branched portion, two air bags (for example, a front seat air bag and a rear seat air bag) can be connected to one inflator and the two air bags can be developed simultaneously at the time of inflator activation without causing any time lag between the two air bags.

Further, when the rupturable plate is formed in a disk shape, regarding the plurality of openings formed in the distal end portions of the branched portion of the gas discharging duct, it is desirable that each opening diameter thereof is smaller than a radius of the rupturable plate. Generally, a peripheral edge portion of the disk-like rupturable plate shape is fixed to a predetermined position, and it is deformed in a semi-spherical shape by receiving the pressure of the pressurized medium, having the central portion deformed most. When the rupturable plate in this state is ruptured by the igniter, the rupturable plate is liable to break in a petal shape from the central portion in all directions. As a result, the maximum length of fragments formed at the time of rupturing is approximately equal to the radius of the rupturable plate. Therefore, in this invention, it is desirable that the opening diameter of the opening of the branched portion distal end serving as a final gas output in the inflator is set to be smaller than the radius of the rupturable plate in order to collect fragments unfailingly.

Further, it is desirable that the plurality of openings formed at the distal ends of the branched portion are formed on periphery in the branched portion distal ends and the end surfaces of the branched portion distal ends are closed. Thereby, a flow of a gas inside the gas discharging duct becomes further complicated and fragments of the rupturable plate and the like gathers at the end surfaces of the distal ends in the branched portion, and consequently, the plurality of openings are prevented from being closed by the fragments of the rupturable plate.

According to the present invention, there is provided an inflator for an air bag which can show a stable operation performance without inflow of fragments of a rupturable plate into an air bag, is not influenced by environmental change regarding its durability while reducing manufacturing cost in addition to a shape limitation of an inflator because of an arrangement place, and is easy to connect with a curtain air bag and takes no mounting space

DETAILED DESCRIPTION OF THE INVENTION

Figure 1:
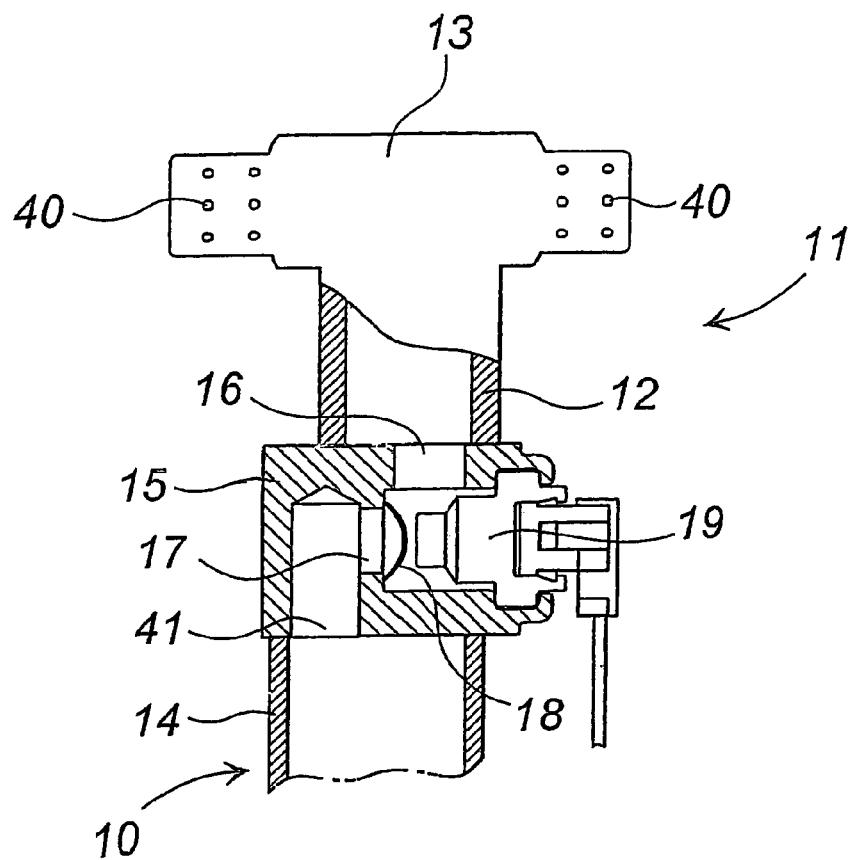
FIG. 1 is an enlarged sectional view of a principal portion of an inflator.
Figure 2:
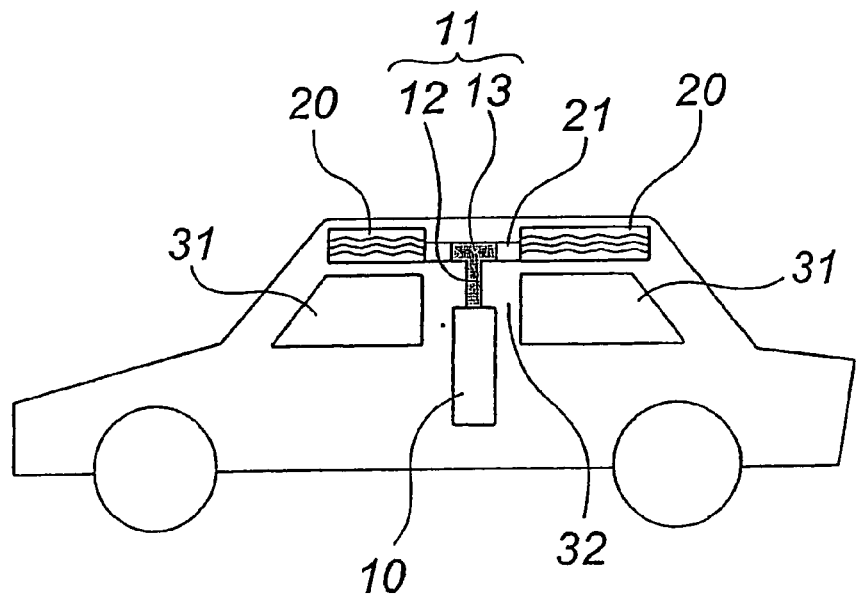
FIG. 2 is a schematic diagram showing an automobile provided with an air bag system.
Figure 3:
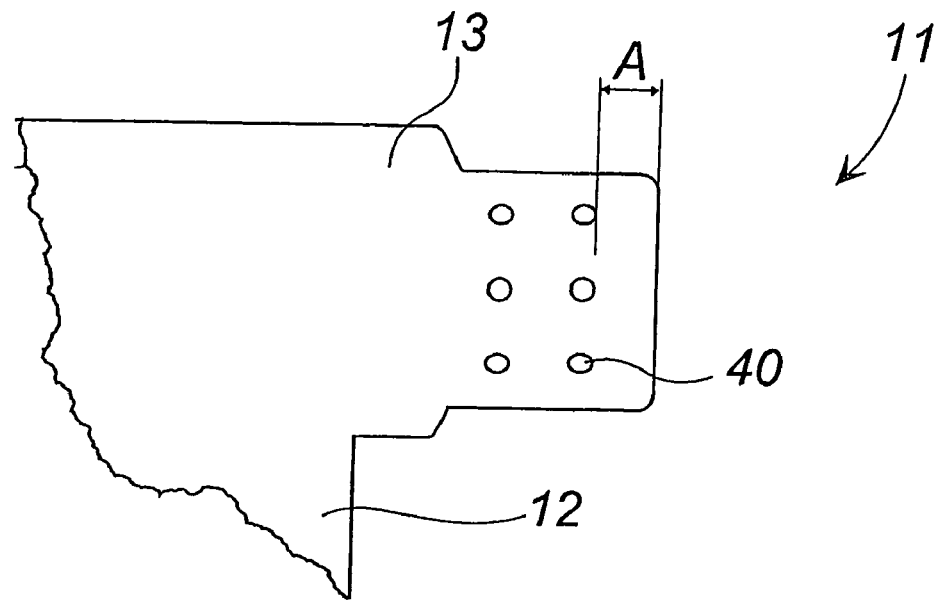
FIG. 3 is an enlarged sectional view of a principal portion of an end portion in a branched portion of a gas discharging duct.
Figure 4:
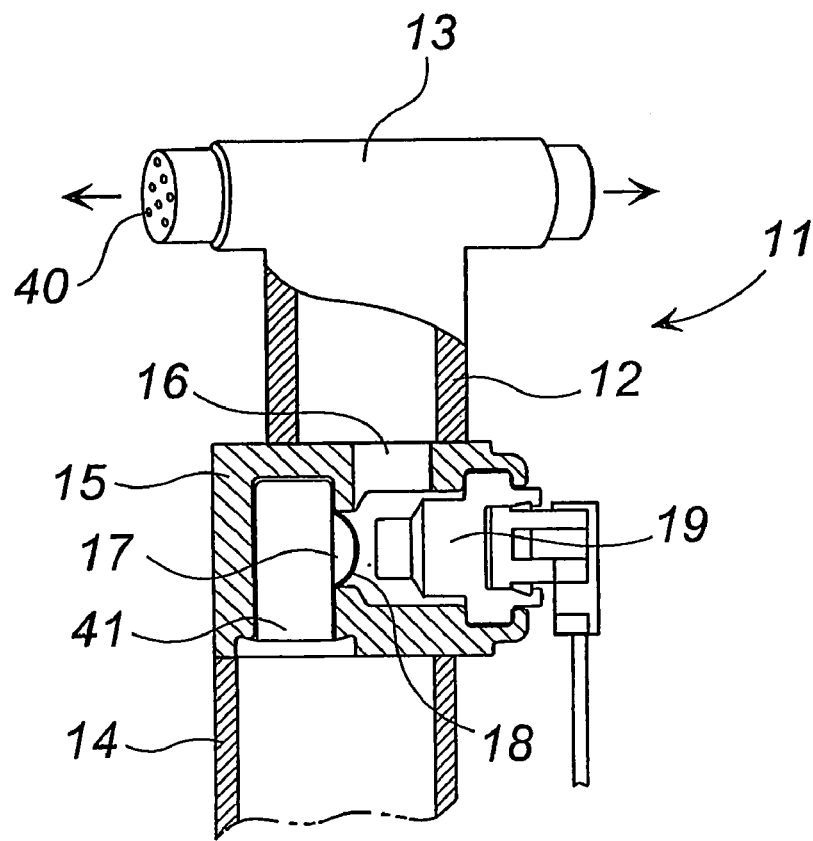
FIG. 4 is an enlarged sectional view of a principal portion of another inflator.
Figure 5:
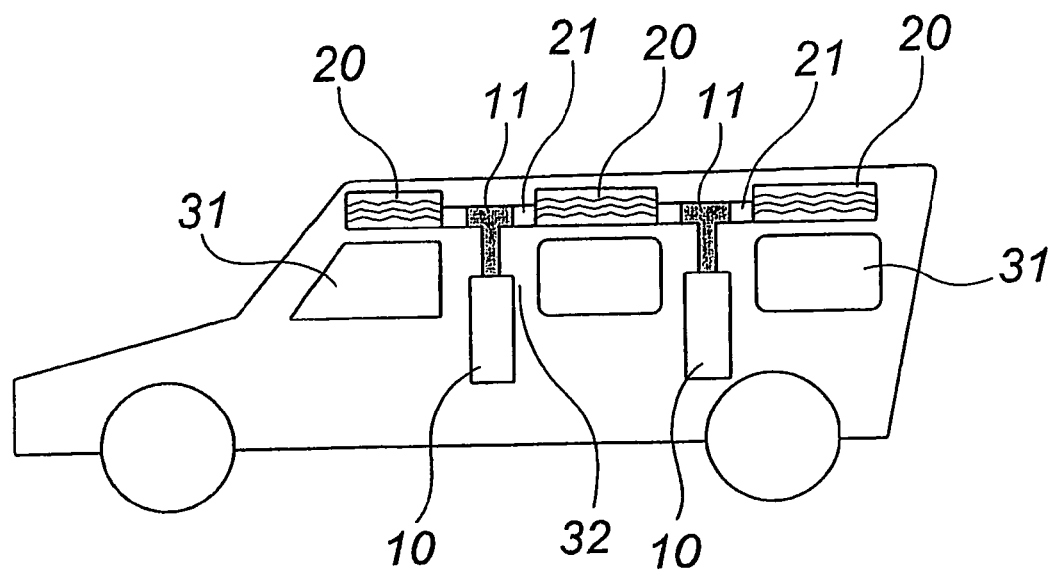
FIG. 5 is a schematic diagram showing another automobile provided with an air bag system.

Embodiments of the present invention will be explained with reference to the drawings. FIG. 1 and FIG. 4 are enlarged sectional views of principal portions showing embodiments of an inflator for an air bag according to the present invention, FIG. 2 and FIG. 5 are schematic views showing automobiles mounted with air bag systems of the embodiments. Further, FIG. 3 is an enlarged sectional view of a principal portion showing an end portion of a branched portion of a gas discharging duct.

In an inflator 10 shown in FIG. 1, a diffuser portion 15 is fixed to an opening portion of an inflator housing 14 (the lower end portion of the inflator housing 14 is not shown in the drawing) and a gas discharging duct 11 in substantially a "T"-letter shape is provided at the diffuser portion 15. In the inflator housing 14, the lower end portion is closed, and a pressurized medium charging portion, through which a pressurized medium such as a pressurized gas or a liquefied gas is charged, and closed after charging, may be provided at any position of the inflator housing 14 not shown in the drawing.

The diffuser portion 15 fixed to the opening portion of the inflator housing 14 is provided with a gas discharging port 16 opened in an axial direction of the inflator housing 14 and an orifice portion 17 connected to an inner space of the inflator housing 14, and the orifice portion 17 is closed by a rupturable plate 18 made of a metal plate. An igniter 19 is arranged to face the rupturable plate 18, namely, to cross the axis of the inflator housing 14. This orifice portion 17 has a function of controlling a flow amount of the pressurized medium charged inside the inflator housing.

The diffuser portion 15 is provided with the gas discharging duct 11 which introduces a gas flowing out of the gas discharging port 16 in the axial direction of the housing at activation of the inflator 10 and also extends the flow thereof horizontally. Thereby, when this inflator 10 is installed in a vehicle, it can be installed inside a B pillar 32 as shown in FIG. 2, and it can directly and easily be connected to air bags 20 which are horizontally provided in the roof side of the vehicle (or at pipes 21 connecting to the air bags 20).

The inflator 10 arranged inside the B pillar 32 in the vehicle is arranged to be long vertically. By installing the inflator 10 such that the axis thereof directs vertically in this manner, even if water drops adhere to a periphery due to sudden environmental change or the like, they flow downward and fall off. As a result, corrosion of the housing, caused by rust-through on the inflator 10 surface, can be suppressed. Accordingly, the inflator 10 can also be formed of an inexpensive iron. Further, such an inflator 10 can be realized that can be installed nearly without changing occupants' space inside the vehicle because the inflator can be installed inside the B pillar 32.

Further, the gas discharging duct 11 comprises a guiding portion 12 connected to the diffuser and a branched portion 13 branching oppositely, and respective distal ends of the branched portion 13 can be connected to different air bags 20 (or the pipes 21 connecting to the air bags 20). Since distal end peripheries of the branched portion 13 are formed with a plurality of openings (namely, hole portions 40), a gas inside the inflator 10 is discharged from the hole portions 40 formed at both end peripheries of the branched portion 13, so that two air bags 20 can be developed simultaneously. Further, as shown in the principal enlarged view of FIG. 3, by setting a distance (A) between a hole(s) of the hole portions 40 formed on the gas discharging duct 11, which is positioned nearest to the end surface of the branched portion 13, and the end surface to be larger than the radius of the rupturable plate 18, when fragments of the rupturable plate and the like are gathered at distal end portions of the branched portion 13 due to a complicated flow of the gas inside the gas discharging duct 11, these fragments of the rupturable plate and the like are more likely to be gathered at the distal end portions. In this case, the hole portions 40 for discharging the gas flowing into the gas discharging duct 11 to the air bags 20 can be formed at both end faces in an axial direction of the outflow pipe, as shown in FIG. 4.

Accordingly, by using such a "T"-letter shaped gas discharging duct 11, the inflator 10 can be arranged lengthwise and gas flow passages from the inflator 10 to the air bags 20 can be shortened, and thereby, a gas discharged from the inflator 10 can be introduced to the air bags 20 swiftly. Further, since two air bags 20 can be simultaneously inflated by one inflator 10, curtain air bags 20 provided at front seat and a rear seat in a vehicle in FIG. 2 can be developed swiftly and simultaneously without any time delay. With respect to this, if an inflator 10 is connected to only one air bag (bag A) and the other air bag (bag B) is inflated by a gas passed through the one air bag (the bag A), the inflation of the other air bag (the bag B) delays from the inflation of the one air bag (the bag A), which is not preferable in view of safety. However, in the air bag system according to this embodiment, the air bag (the bag A) and the other air bag (the bag B) in this case can be simultaneously inflated, such a problem can be solved.

In the inflator 10 shown in this embodiment (in FIGS. 1 and 4), since the orifice 17 is provided at a position nearer to the inflator housing 14 than the rupturable plate 18, this orifice 17 is never closed by fragments of the rupturable plate 18. In this case, in this inflator 10, the function of the orifice portion 17 can be provided with a gas introducing port 41 of the diffuser portion 15. Even in this case, the opening area of the gas introducing port 41 is formed to have an opening area smaller than the total opening area of the plural openings (the hole portions 40) provided at the distal ends of the branched portion in the gas discharging duct and the rupturable plate 18 exists at a downstream side from a position of the gas introducing port 41, fragments of the rupturable plate do not gather in the gas introducing port 41 (namely, the orifice portion) but they gather in the gas discharging duct 11. As a result, the gas amount adjusting function of the orifice portion 41 is not influenced at all.

In the inflator 10 formed as described above, the igniter 19 receives an activation signal from activation signal outputting means not shown in the drawing and activate to rupture the rupturable plate 18. Consequently, the pressurized medium inside the inflator housing 14 flows in the diffuser portion 15 at a dash and then flows from the gas discharging port 16 into the guiding portion 12 of the gas discharging duct 11. At this time, since the gas flows in the axial direction of the inflator housing 14, it flows swiftly without colliding against a wall surface. The gas flows from the guiding portion 12 into the branched portion 13 and, simultaneously, the flowing direction is turned to the horizontal direction, and the gas flows into the air bags directly to inflate the air bags 20.

FIG. 5 shows an air bag system installed in a vehicle having three row seats. As shown in this drawing, curtain air bags 20 are installed for respective seats, and inflators 10 are each installed at a pillar 32 between the first row seat and the second row seat and a pillar 32 between the second row seat and the third row seat. The inflator 10 shown in this drawing is the same as the one shown in FIG. 1 and can achieve the same advantageous effect.

Incidentally, in the above-described embodiment, the curtain air bag system and the inflator 10 used therein are described as an example, but the air bag system or the inflator 10 constituted in the same manner can be installed at a driver side, a front passenger side or a side of a passenger.

Figure 6:
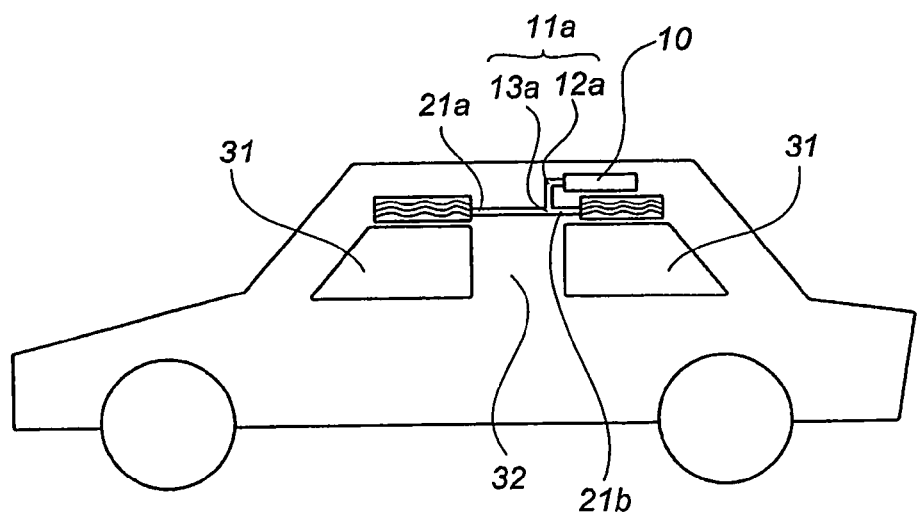
FIG. 6 is a schematic diagram showing still another automobile provided with an air bag system.

In FIG. 6, another embodiment of an inflator for an air bag and an air bag system using this inflator is shown. The system shown in this drawing is different from the system shown in FIG. 2 in mounting position and direction of an inflator. That is, in this embodiment, the inflator 10 is provided a ceiling or the like in the vicinity of side windows 31 and 31 of a vehicle such that the central axis of a housing thereof is oriented horizontally. In view of the circumstances of such a mounting direction of the inflator, a gas discharging duct 11a shown in FIG. 6 is different from the gas discharging duct 11 shown in FIG. 2, and a guiding portion 12a thereof turns its direction on the way such that the guiding portion 12a extends in the axial direction of the housing but bends vertically on its way. A tip end of the bent portion is connected to the branched portion 13a, and the branched portion 13a branches into the front seat side (left in the drawing) and the rear seat side (right in the drawing) in the vehicle as shown in the drawing.

In the embodiment shown in FIG. 6, the inflator 10 is installed on the rear side of a B pillar (a center pillar) in the vehicle. The inflator 10 is installed at such a position because it is difficult to install the inflator in the middle between the front seat and the rear seat on account of a mounting space in the vicinity of the ceiling of the vehicle. The gas discharging duct is also installed nearer to the rear side of the vehicle (near to a side window 31 in the rear side) due to the installation of the inflator 10 at such a position. For this reason, pipes 21a and 21b, which connect the air bags 20 and the distal ends of the branched portion 13a of the gas discharging duct ha are different in length, and the pipe 21a directed to the front seat is larger than the pipe 21b directed to the rear seat. Accordingly, there is a time lag between the time when an inflating gas, which is discharged from the gas discharging port (indicated by reference numeral 16 in the FIG. 1) of the inflator 10, reaches the air bag 20a disposed at the front seat and the time when the inflating gas reaches the air bag 20b disposed at the rear seat. Further, is there also a difference in inflating pressure between the air bags, and a difference in a development starting or terminating time between the air bags. In view of these circumstances, the air bag at the front seat and the air bag at the rear seat can be developed equally by varying the total opening areas of the hole portions (indicated by reference numeral 40 in FIG. 1) which are formed on the respective ends of the branched portion 13, that is, by making the total opening area in the air bag 20*a* side in the front seat different from the total opening area in the air bag 20*b* side in the rear seat. Particularly in the case shown in this embodiment, the total opening area of the hole portions in the air bag 20*a* side in the front seat of the vehicle is made larger than the total opening area of the hole portions in the air bag 20*b* side in the rear seat of the vehicle.

What is claimed is:

1. An inflator for an air bag, comprising:
a cylindrical inflator housing charged with a pressurized medium inside and formed with an opening portion at an axial end portion thereof;
a diffuser portion installed at the opening portion of the inflator housing, provided with a gas discharging port, and having an inner space extending from the opening portion to the gas discharging port as a gas flow passage;
a rupturable plate provided in the gas flow passage inside the diffuser portion to seal outflow of the pressurized medium;
ignition means accommodated inside the diffuser portion and adapted to rupture the rupturable plate upon activation; and
a gas discharging duct extending from the gas discharging port and having a distal end branched in opposite two directions, wherein
an orifice portion for regulating a gas flow amount is formed in the gas flow passage inside the diffuser portion while distal ends of the branched portions in the gas discharging duct are formed with a plurality of openings, and
the plurality of openings provided at the distal end of the branched portion in the gas discharging duct are formed such that the total opening area thereof is larger than the opening area of the orifice portion.

2. An inflator for an air bag according to claim 1, wherein the total opening area of the plurality of openings provided at one of the distal ends of the branched portion in the gas discharging duct is different from the total opening area of the plurality of openings provided at the other distal end of the branched portion.

3. An inflator for an air bag according to claim 1 or 2, wherein the inflator housing has a cylindrical shape elongated in an axial direction thereof, and the branched portion of the gas discharging duct is formed in a substantially "T"-letter shape.

4. An inflator for an air bag according to any one of claims 1 to 2, wherein the inflator housing has a cylindrical shape elongated in an axial direction thereof, and the gas discharging duct extends in the axial direction of the inflator housing to then turn at one or at least two portions and the branched portion formed in the substantially "T"-letter shape is provided ahead thereof.

5. An inflator for an air bag according to any one of claims 1 to 2, wherein the rupturable plate is formed in a disk shape, and each opening of the plurality of openings provided at the distal ends of the branched portion in the gas discharging duct is formed to have a diameter smaller than a radius of the rupturable plate.

6. An inflator for an air bag according to any one of claims 1 to 2, wherein end surfaces of the distal ends of the branched portion in the gas discharging duct are closed and the plurality of openings are formed on peripheries of the distal ends of the branched portion.

7. An inflator for an air bag according to any one of claims 1 to 2, wherein the ignition means includes an igniter adapted to receive an electric signal upon activation, and the igniter is arranged inside the diffuser portion to cross the axis of the inflator housing.

* * * * *